United States Patent [19]
Kimura

[11] Patent Number: 6,108,888
[45] Date of Patent: Aug. 29, 2000

[54] METHOD FOR MAKING A LID WITH A SPOUT AND A MOLD STRUCTURE THEREFOR

[75] Inventor: Katsunori Kimura, Ichihara, Japan

[73] Assignee: Maeda Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/114,824

[22] Filed: Jul. 14, 1998

[30] Foreign Application Priority Data

Jul. 16, 1997 [JP] Japan .................................... 9-207306

[51] Int. Cl.⁷ ............................ B23Q 17/00; B29C 13/00
[52] U.S. Cl. ........................ 29/407.01; 264/275; 264/279; 222/530; 222/572
[58] Field of Search ....................... 29/407.01; 264/271.1, 264/275–279; 220/254; 222/529, 530, 538, 572

[56] References Cited

U.S. PATENT DOCUMENTS

| | | |
|---|---|---|
| 4,865,793 | 9/1989 | Suzuki et al. .......................... 264/278 |
| 4,899,902 | 2/1990 | DeMars .................................... 220/254 |
| 4,946,062 | 8/1990 | Coy ........................................ 220/90.4 |
| 5,094,388 | 3/1992 | Chapman, Jr. .......................... 239/29.3 |
| 5,147,066 | 9/1992 | Snider ..................................... 220/717 |
| 5,437,400 | 8/1995 | Loeffler .................................. 222/570 |
| 5,527,173 | 6/1996 | Miller et al. .......................... 425/126.1 |
| 5,669,526 | 9/1997 | Keyfauver ............................... 220/696 |
| 5,785,201 | 7/1998 | Bordner et al. ......................... 220/321 |
| 5,893,489 | 4/1999 | Giarrante ................................ 222/482 |
| 5,899,364 | 5/1999 | McLelland et al. ............... 222/153.06 |
| 5,913,460 | 6/1999 | Arciniegas ............................. 222/530 |
| 5,950,876 | 9/1999 | McLelland et al. ............... 222/153.06 |
| 5,967,376 | 10/1999 | McLelland et al. ............... 222/153.06 |
| 5,992,710 | 11/1999 | Lovell et al. ........................... 222/525 |

*Primary Examiner*—David P. Bryant
*Assistant Examiner*—Essama Omgba
*Attorney, Agent, or Firm*—Bierman, Muserlian and Lucas

[57] ABSTRACT

A method for making a lid with a spout is disclosed. The spout is affixed in an opening of the lid by injection molding the lid about the spout while the spout is held in place in the injection mold. The steps of molding the lid and affixing the spout to the lid are performed at the same time without the detriments of conventional ultrasonic welding. Preferably, a core insertion member is used in a movable base mold and a cavity insertion member is used in a fixed base mold to hold the spout in place and to mold the lid thereabout.

5 Claims, 6 Drawing Sheets

METHOD FOR MAKING A LID WITH A SPOUT AND A MOLD STRUCTURE THEREFOR

BACKGROUND OF THE INVENTION

1. Field of the Invention

The present invention relates to a method for making a lid with a spout and a mold structure therefor. More particularly, the invention relates to a method for molding a plastic lid used for articles such as pails and also relates to the structure of the mold employed in molding the lid with the spout.

As used herein, "spout" means the pouring portion of a lid which is affixed to an opening of the lid. The spout can be made of, for example, a thin, flexible plastic material. The spout may stowed in the lid when not in use and is pulled out from the lid when in use.

An object of the present invention is to simplify the process of affixing the spout to the lid. Another object of the present invention is to improve the working conditions of the molding environment. A further object of the present invention is to improve the quality and shape of the finished molded article.

2. Description of Related Prior Art

The prior art teaches a variety of spouts which are affixed to a lid. The spouts may be stowed inside or protrude outside the lid.

The conventional process for joining a lid with a spout employs ultrasonic welding to join the spout to the lid. The conventional method is discussed in detail as follows:

(a) A plastic lid is molded by an injection molding machine;

(b) a gasket is applied to the entire peripheral groove portion of the side of the lid by an automatic lining machine;

(c) an opening for insertion of the spout is made in the lid by an automatic punching machine;

(d) a spout is inserted in the opening by an automatic pressing-in machine;

(e) a flange of the spout is welded on the lid by an ultrasonic welder;

(f) a cap is screwed into the spout-by an automatic capping machine;

(g) the welded portion is checked for leakproofness by an automatic leak tester;

(h) each lid is checked for proper lining of the gasket by a visual test; and (i) the cap screwed onto the spout is checked by a visual test.

FIGS. 6a and 6b illustrate the conventional method where the spout is affixed to the lid by ultrasonic welding. Here, spout 25 is affixed to lid 24 to form lid with spout 35. Lid with spout 35 is made by operating ultrasonic vibrator (not shown) while laying ring groove 26a of hone 26 on standing portion 25b of spout 25, and by welding standing portion 25b to the reverse side of the lid 24 while pressing the standing portion 25b to the outside.

The conventional method for making a lid with a spout comprises molding the lid, making the opening for the spout in a predetermined portion of the lid, inserting the spout in this opening and then welding the standing portion of the spout to the lid by ultrasonic welding. Therefore, separate operations of forming the components, making an opening in the lid, and ultrasonic welding of the spout to the lid have to be performed.

The conventional working process is complicated and the ultrasonic welding involves oscillation noise and disturbances in the working environment. Additionally, many highly technical factors are involved in ultrasonic welding such as maintenance of hone, frequency of the ultrasonic vibrator and temperature of the welding environment. If these factors are not kept in a suitable range, the welding may not be done properly and the contents may leak from the finished article at the welded portion. It is therefore desirable to obtain a method to make a lid with a spout which avoids the use of ultrasonic welding.

SUMMARY OF THE INVENTION

A method for making a lid with a spout and a mold structure therefor has now been discovered which avoids the problems of the prior art. More particularly, it has been found that ultrasonic welding is not needed to affix the spout to the lid, and that the steps of molding the plastic lid and affixing the spout to the lid are performed at the same time.

In accordance with the present invention, an element for inserting and holding a spout in a predetermined place in an injection mold is employed. The lid is molded about the spout while the spout is held in place. Preferably, a core insertion member is employed as the element for inserting and holding the spout into a predetermined place in the mold. Additionally, a cavity insertion member is fixed in the mold to hold the spout in place while the lid is molded thereabout.

According to a feature of the invention, all workers have to do is to mold the lid about the spout while the spout is kept in place in the mold by the insertion members. This type of molding is called insert molding. The present invention makes it possible to form a lid with a spout therein without the additional steps of the conventional working process of making an opening in the lid for the spout and welding the spout to the opening, as is generally done in the conventional process.

Therefore, ultrasonic welding is avoided and workers are free from the temperature control and oscillation noise of the ultrasonic welding of the conventional process.

Further, as the shape of the molded portion of the lid and spout is specified by molding accuracy and mold surface, the thickness, area and properties of the surfaces can be controlled more accurately and stably to make a more uniform product.

A further advantage of the present invention is that a conventional injection mold may be modified for use in accordance with the present invention. The core and cavity insertion members of the present invention are adapted into the mold.

BRIEF DESCRIPTION OF THE DRAWINGS

These and other aspects of the present invention may be further understood in reference to the following drawings.

DESCRIPTION OF THE PREFERRED EMBODIMENTS

Figure 1:
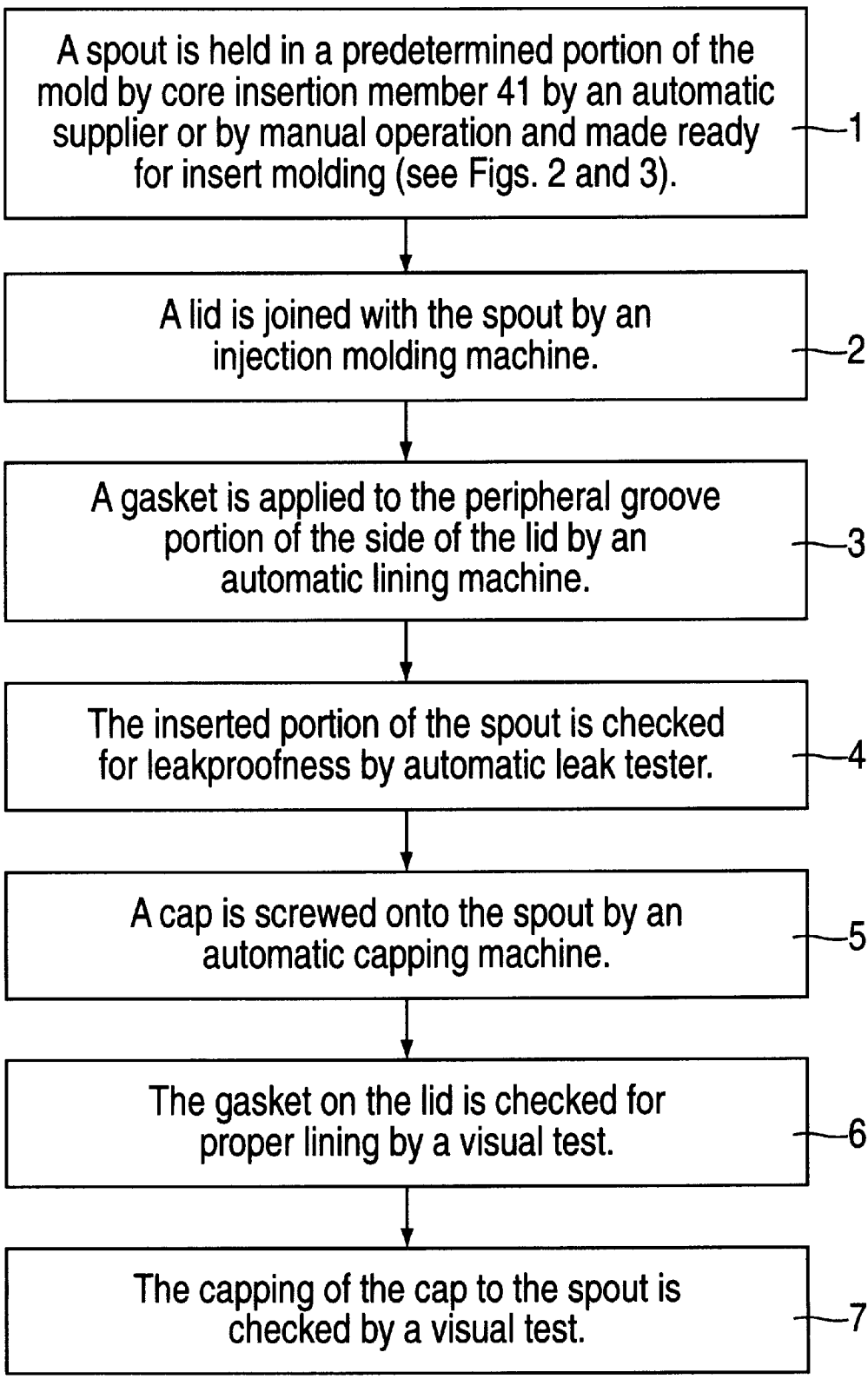
FIG. 1 illustrates the process of making the lid with a spout by insert molding according to the present invention.
Figure 2:
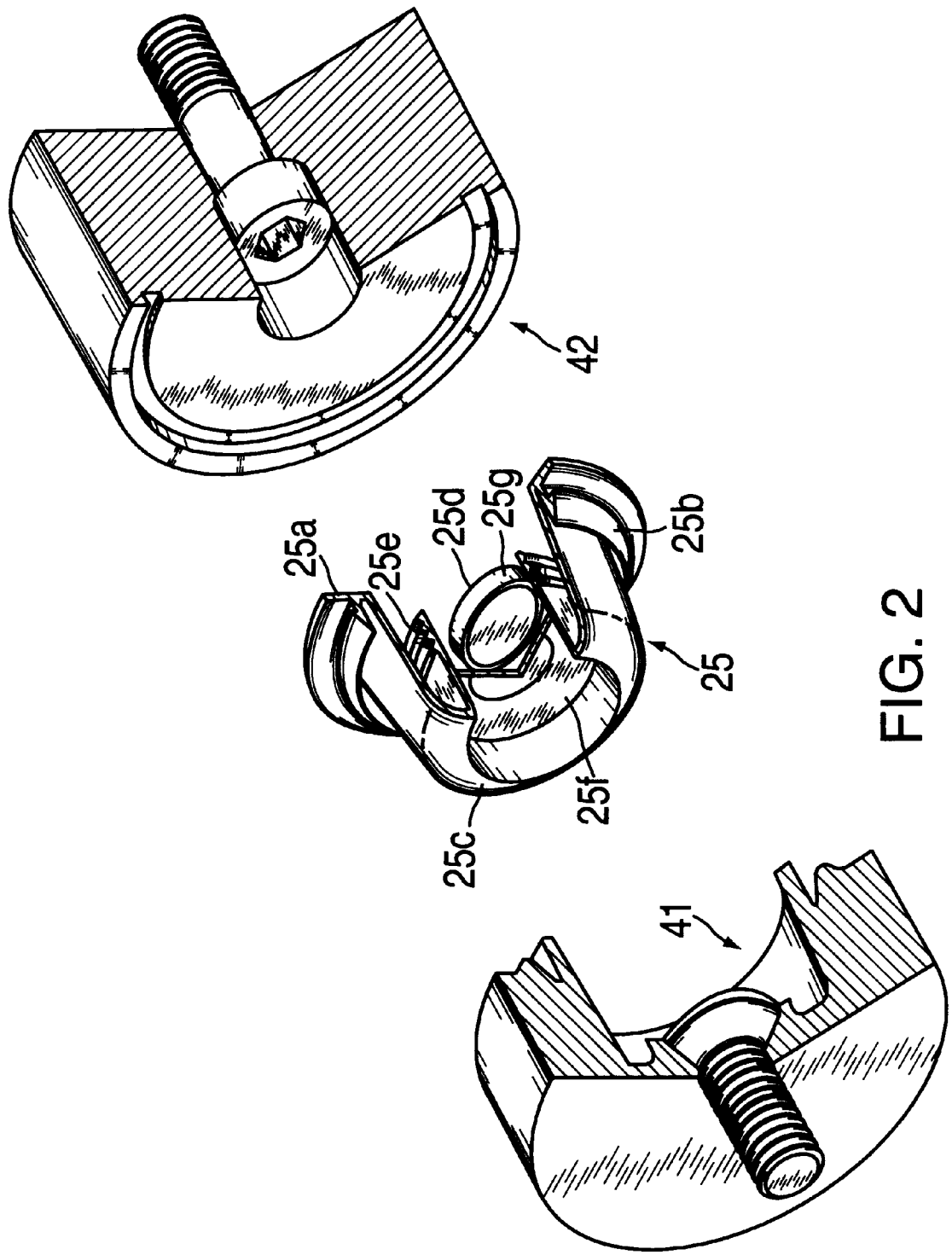
FIG. 2 illustrates the spout and insertion members for insert molding according to the present invention.
Figure 3:
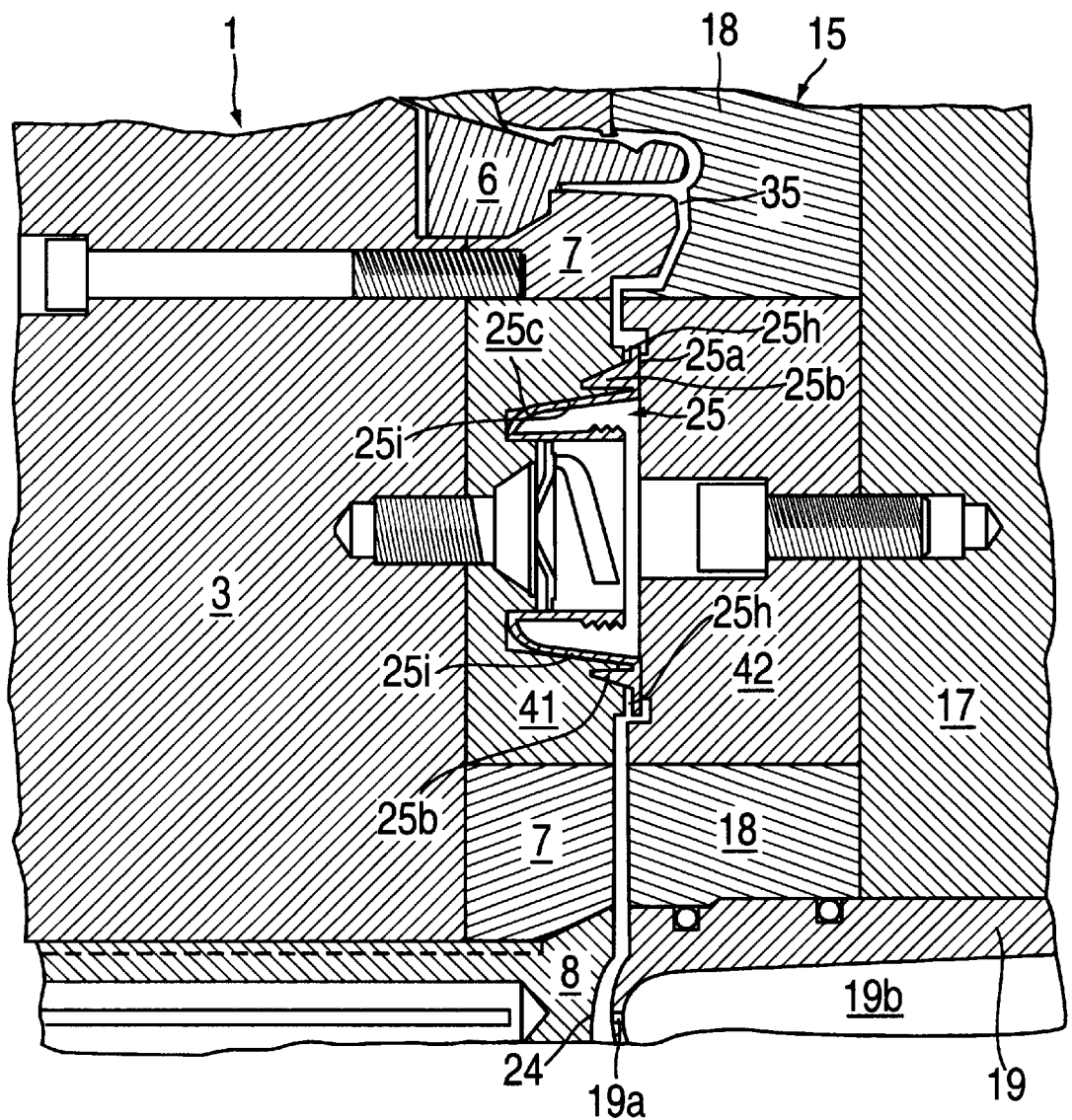
FIG. 3 illustrates the essential parts of the injection mold for molding the lid with spout according to the present invention.

As illustrated in FIG. 1, the process of making the lid with a spout in accordance with the present invention comprises the following:

(1) A spout is held in a predetermined portion of the mold by core insertion member 41 by an automatic supplier or by manual operation and made ready for insert molding (see FIGS. 2 and 3).

(2) A lid is joined with the spout by an injection molding machine. The lid is made of plastic, for example, polyethylene (see FIG. 3).

(3) A gasket is applied to the peripheral groove portion of the side of the lid by an automatic lining machine.

(4) The inserted portion of the spout is checked for leakproofness by an automatic leak tester. Since this test is performed before fitting the cap to the spout, even a small pinhole in the spout which is difficult to be found with the cap on tightly can be checked.

(5) A cap is screwed onto the spout by an automatic capping machine.

(6) The gasket on the lid is checked for proper lining by a visual test.

(7) The capping of the cap to the spout is checked by a visual test.

All of the conventional parts of the injection molding apparatus are not shown in the figures herein; the parts which are adapted for use in the present invention, namely, the core and cavity insertion members and the surrounding mold core and cavity portions are shown. Injection molding and injection molding apparatuses are well known to those of skill in the art and any conventional injection molding apparatus can be adapted for use in the present invention by employing the adaptations disclosed herein.

As shown in FIG. 2, spout 25 comprises flange 25a, standing portion 25b, flexible portion 25c, opening for pouring contents 25d, and threaded portion 25e for screwing or unscrewing cap. Core insertion member 41 holds the spout in place for insert molding and cavity insertion member 42 is in the mold during insert molding.

The shape of the spout is generally the same as a conventional spout but any shape of spout may be used. The configuration of the core insertion member 41 must correspond to the shape of the spout in order to properly hold the spout in place during molding of the lid about the spout.

As shown in FIG. 3, core insertion member 41 and cavity insertion member 42 are set in movable base mold 3, 7 in mold core 1 and in fixed base mold 17, 18 in mold cavity 15, respectively, in the same way as a conventional mold.

During molding, core insertion member 41, while holding spout 25, is moved in the direction of cavity insertion member 42. Spout 25 is firmly held by flange 25a between the core insertion member 41 and the cavity insertion member 42, with the portion of the upper face of flange 25a against cavity insertion member 42. The space where the injected material is inserted to form the lid is next to flange 25a between core insertion member 41 and cavity insertion member 42.

Lid 24 with spout 25 therein is molded by injecting molten material through the room 19b and port for injecting plastic 19a in the same way as in conventional injection molding.

Figure 4:
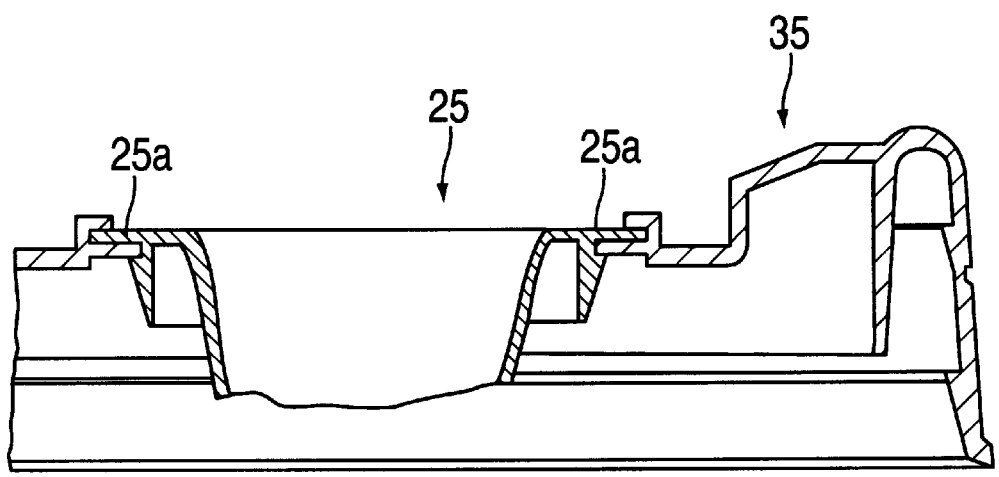
FIG. 4 illustrates the affixed portion of the molded lid with spout according to the present invention.

FIG. 4 shows that the part of plastic material injected in the molding space between mold core 1 and mold cavity 15 holds flange 25a of spout 25 at both sides to make lid with spout 35.

The properties of the molded portion around the flange, for example, the thickness and smoothness of the surface, can be determined by the shape and accuracy of the core insertion member 41 and cavity insertion member 42. Because of more precise shaping and joining of the lid with spout, possible leakage of the contents of the article may be avoided.

Figure 5A:
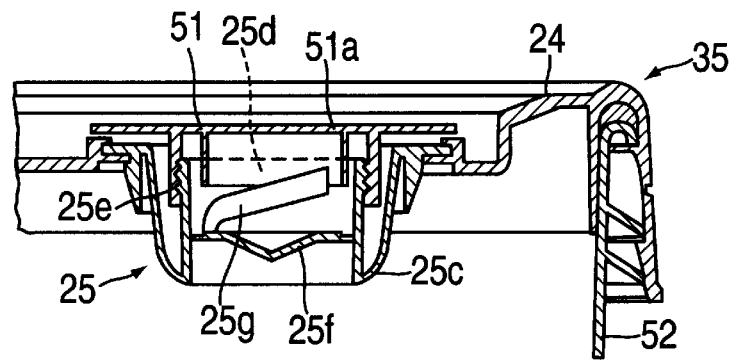
FIGS. 5a, 5b and 5c illustrate the lid with spout in use according to the present invention.
Figure 5B:
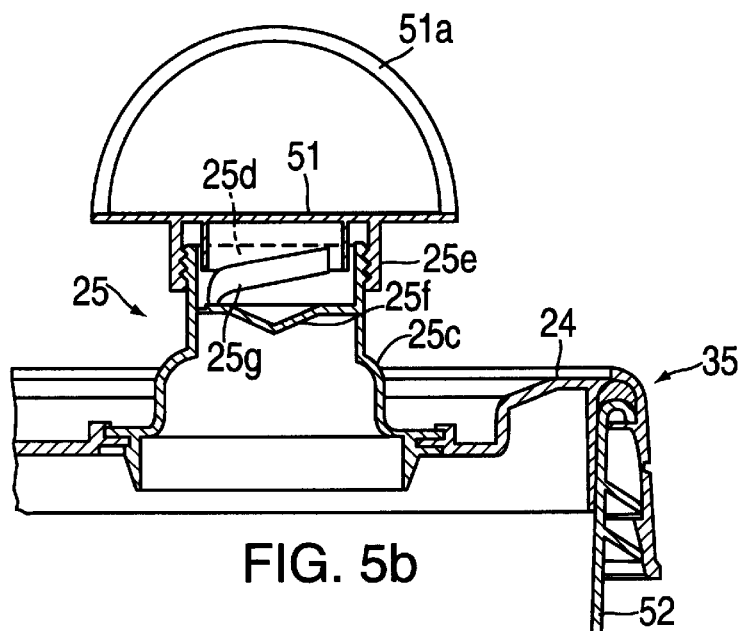
Figure 5C:
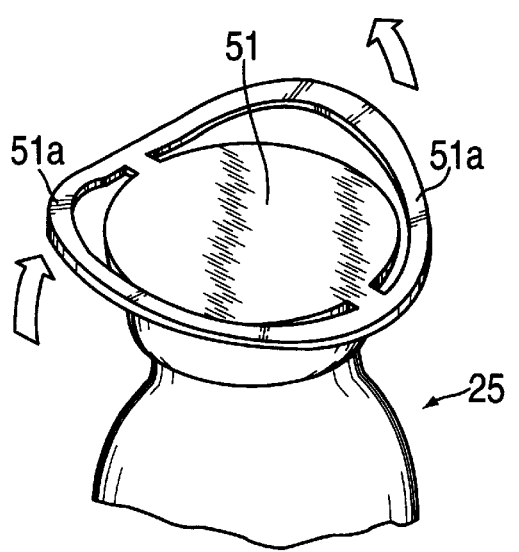
Figure 6A:
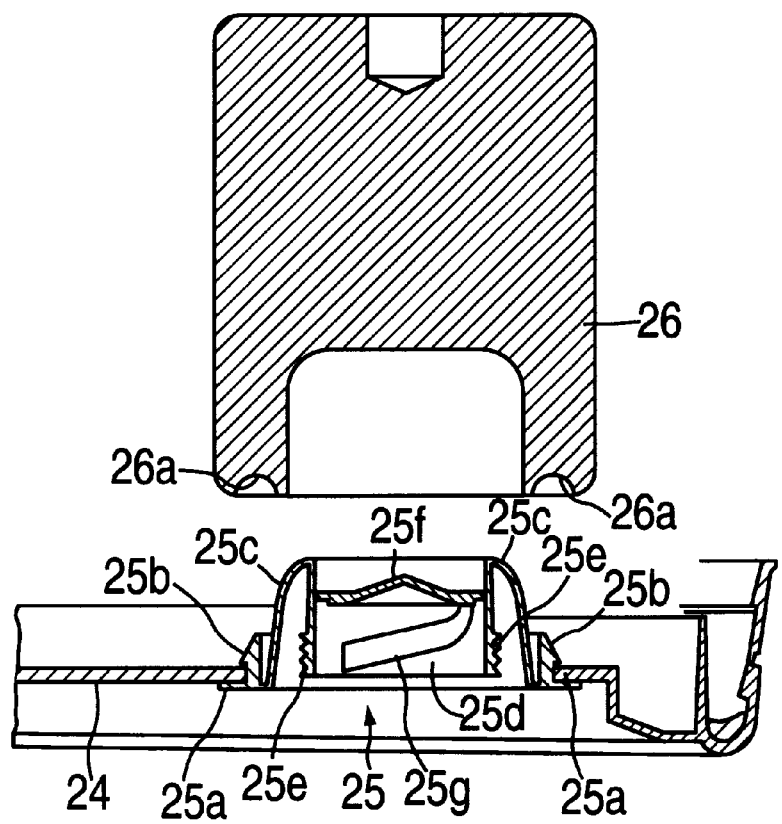
FIGS. 6a and 6b illustrate the conventional method of affixing the spout to the lid by ultrasonic welding.
Figure 6B:
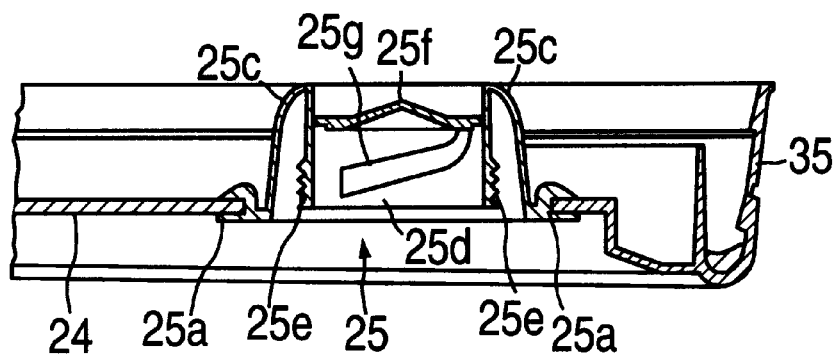

FIGS. 5a, 5b and 5c show the lid in various types of use. Cap 51 is screwed onto spout 25 of lid 24 on pail 52. Cap 51 may have one or more handles 51a.

FIG. 5a illustrates the case where spout 25 is not used and is stowed so as not to protrude from the top face of the lid 24. This case provides for effective stacking and transporting.

FIG. 5b illustrates the case where the spout 25 protrudes from the lid 24 by pulling upward on standing handle 51a. In this case, after taking off the cap by turning handle 51a, sealed portion 25f may be torn off by pulling handle for unsealing 25g and the contents can be poured from opening 25d. FIG. 5c shows the configuration of cap 51 and handle 51a.

According to the present invention, the steps of affixing the spout to the lid and forming the lid itself are carried out at the same time by insert molding with the spout being held in the portion of the mold corresponding to the desired opening. This method is also performed without the onerous step of ultrasonic welding. The process of the present invention is therefore simpler than the conventional process because of the exclusion of the ultrasonic welding step.

It will be understood that the claims are intended to cover all changes and modifications of the preferred embodiments of the invention herein chosen for the purpose of illustration which do not constitute a departure from the spirit and scope of the invention.

What is claimed is:

1. In a method for making a lid with a spout in which the spout is affixed to the lid by injection molding, the improvement comprising the steps of:

(a) holding the spout in a portion of a mold corresponding to its position in the lid,
    wherein the spout comprises
    a flexible portion through which material flows during pouring,
    a flange extending perpendicularly from one end of the flexible portion, and
    a standing portion extending perpendicularly from one side of the flange,
    the flange and the standing portion of the spout forming a groove which faces away from the flexible portion, and
    wherein the spout is held in the mold such that the standing portion is in complete contact with the mold except in said groove and said flange is in contact with said mold on the other side of said flange, opposite said standing portion;

(b) molding the lid about the spout to form the lid with the spout,
    wherein the lid forms about the flange, and fills the groove, and
    wherein contact between the lid and the flexible portion is prevented during molding because of the contact of the standing portion and the flange with the mold.

2. The method of claim 1 wherein an insertion member is used to hold the spout in the mold.

3. A method for making a lid with a spout by injection molding comprising the following steps:
   (a) holding the spout in a predetermined portion of an injection mold by a core insertion member, the spout being held by the core insertion member against a cavity insertion member;
   wherein the spout comprises
   a flexible portion through which material flows during pouring,
   a flange extending perpendicularly from one end of the flexible portion, and
   a standing portion extending perpendicularly from one side of the flange,
   the flange and the standing portion of the spout forming a groove which faces away from the flexible portion, and
   wherein the spout is held by the core insertion member such that the standing portion is in complete contact with the core insertion member except in said groove and said flange is in contact with said cavity insertion member on the other side of said flange, opposite said standing portion;
   (b) joining the lid with the spout by injection molding the lid about the spout to form the lid with the spout,
   wherein the lid forms about the flange, and fills the groove, and
   wherein contact between the lid and the flexible portion is prevented during molding because of the contact of the standing portion with the core insertion member and the contact of the flange with the cavity insertion member.

4. A mold structure to make a lid with a spout wherein the spout is affixed in the lid, said structure comprising:
   (a) a core insertion member to hold the spout in a portion of the mold corresponding to its position in the lid,
   wherein the spout comprises
   a flexible portion through which material flows during pouring,
   a flange extending perpendicularly from one end of the flexible portion, and
   a standing portion extending perpendicularly from one side of the flange,
   the flange and the standing portion of the spout forming a groove which faces away from the flexible portion, and
   wherein the spout is held by the core insertion member such that the standing portion is in complete contact with the core insertion member except in said groove;
   (b) a cavity insertion member, the spout being held by the core insertion member against the cavity insertion member during molding of the lid about the spout, said flange in contact with said cavity insertion member on the other side of said flange, opposite said standing portion
   wherein the lid forms about the flange, and fills the groove, and
   wherein contact between the lid and the flexible portion is prevented during molding because of the contact of the standing portion with the core insertion member and the contact of the flange with the cavity insertion member.

5. A method for making a lid with a spout by injection molding comprising the following steps:
   (a) holding the spout in a predetermined portion of an injection mold by a core insertion member
   wherein the spout comprises
   a flexible portion through which material flows during pouring,
   a flange extending perpendicularly from one end of the flexible portion, and
   a standing portion extending perpendicularly from one side of the flange,
   the flange and the standing portion of the spout forming a groove which faces away from the flexible portion, and
   wherein the spout is held by the core insertion member such that the standing portion is in complete contact with the core insertion member except in said groove and said flange is in contact with a cavity insertion member on the other side of said flange, opposite said standing portion;
   (b) joining the lid with the spout by injection molding
   wherein the lid forms about the flange, and fills the groove, and
   wherein contact between the lid and the flexible portion is prevented during molding because of the contact of the standing portion with the core insertion member and the contact of the flange with the cavity insertion member;
   (c) applying a gasket to the side of the lid;
   (d) checking for leakproofness of the spout to the lid;
   (e) putting a cap onto the spout;
   (f) checking the gasket for proper lining to the lid; and
   (g) checking the application of the cap to the spout.

* * * * *